United States Patent [19]

Waldvogel et al.

[11] Patent Number: 4,728,530
[45] Date of Patent: Mar. 1, 1988

[54] METHOD FOR MENDING DAMAGED AREAS IN PAPERMACHINE FABRICS

[75] Inventors: Hartmut Waldvogel; Georg Borel, both of Reutlingen, Fed. Rep. of Germany

[73] Assignee: Hermann Wangner GmbH & Co. KG, Reutlingen, Fed. Rep. of Germany

[21] Appl. No.: 1,732

[22] Filed: Jan. 9, 1987

[30] Foreign Application Priority Data

Jan. 10, 1986 [DE] Fed. Rep. of Germany ....... 3600577

[51] Int. Cl.⁴ .............................................. B05D 3/06
[52] U.S. Cl. ..................................... 427/44; 427/54.1; 427/140; 427/243; 162/DIG. 1
[58] Field of Search ................ 427/44, 54.1, 140, 243, 427/247; 162/DIG. 1

[56] References Cited

U.S. PATENT DOCUMENTS 3,477,477 11/1969 Domin ................................ 427/243
4,528,239 7/1985 Trokhan ............................ 428/247

Primary Examiner—John H. Newsome
Attorney, Agent, or Firm—Sughrue, Mion, Zinn, Macpeak, and Seas

[57] ABSTRACT

A method for mending a damaged area in a papermachine fabric includes filling the defective area with a photosensitive resin, irradiating the defective area with ultraviolet light through a first mask having a multiplicity of light impervious dots in order to crosslink the irradiated regions and rinsing away the non-crosslinked regions of the photosensitive resin. The patch produced in this way is firmly bonded to the fabric of the papermachine fabric and also has a permeability sufficient for dehydration of the paper pulp.

6 Claims, 3 Drawing Figures

METHOD FOR MENDING DAMAGED AREAS IN PAPERMACHINE FABRICS

BACKGROUND OF THE INVENTION

The invention relates to a method for mending damaged areas in papermachine fabrics made form synthetic resin woven fabrics, especially sheet forming fabrics and drier fabrics woven entirely or partially from polyester monofilament.

While the service life of phosphor bronze papermachine fabrics used nearly exclusively up to 1968 lasted several days or weeks, the service life of synthetic resin papermachine fabrics is several times as long. The price of synthetic resin papermachine fabrics is substantially higher than that of phosphor bronze fabrics. Any damage occurring to synthetic resin papermachine fabrics during operation constitutes a considerable economic disadvantage. Therefore, various methods have been developed to mend damaged areas in synthetic resin papermachine fabrics. In case of larger tears the papermachine fabric cannot be saved because the force transmitting ability of the fabric is interrupted. Sheet forming fabrics transmit force in the range of 120 to 150 kW/m of wire width. In areas where the longitudinal wires are interrupted over a major width the fabric forms a longitudinal wave or so called ridge so that the fabric becomes useless. In case of minor damage areas having a diameter of less than 10 mm, which occur more frequently, there is generally a desire in the papermaking industry to continue using the papermachine fabric at least for some time. Attempts must therefore be made to mend such damaged areas.

Simple stitching over the hole of such a damaged area with synthetic resin or metal filaments is ineffective as such filaments are soon worn through. Another possibility of mending such damaged areas is invisible mending. To this end individual wires around the damaged area are removed from the fabric and are replaced by substitute wires from a reserve patch of the same fabric which consequently have the same knuckles as the wires of the defective papermachine fabric. The substitute wires are threaded in longitudinal and in transverse direction into the papermachine fabric at the defective area and are so interlaced that the original fabric structure of the damaged area is restored. Such a mending method results in a durable repair. However, it is very difficult to perform, as it can be carried out only by trained and experienced personnel. Moreover, said mending method takes a long time so that it can be used only in rare cases. Normally the machine shut down costs very soon exceed the value of the papermachine fabric.

Moreover, methods have been known by which the damaged area is patched up with a woven patch. The fabric selected for the patch must be rather thin so that it does not form too big a hump on the paper face of the papermachine fabric and does not leave excessively deep marks or even holes in the paper web. Monofilamentary woven fabrics, resin impregnated multifilamentary woven fabrics and open leno weave fabrics are employed for the patches. The adhesive is selected among commercial synthetic resins, hot melts, and two component adhesives. The durability of such mended areas varies. Difficulties are encountered particularly in choosing the proper amount of adhesive, because sufficient adhesion of the patch fabric must be attained and, on the other hand, a minimum of interstices in the paper machine fabric should be clogged in the area of the damage. An advance has been achieved with the use of thermoplastic adhesives. In a pretreating step the patch fabric is impregnated with thermoplastic resin. The patch is then fixed to the damaged area by simple ironing in the papermaking machine. However, in this case too, the mending will not last longer than a few days. The patch then comes off in most cases and must be renewed.

Attempts have also been made to employ perforated adhesive film or adhesive nonwoven fabric. Also, with this type of patch the clogging of fine openings in the papermachine fabric could not be prevented.

With some success, damaged areas in papermachine fabrics have been mended by so called ultrasonic welding. To this end, a patch of polyester fabric is welded onto the defective area whose size is generally substantially larger than the damaged area itself and has about two to three times the diameter of the defective area. In general, the patch is welded to the fabric along its margin. This method requires suitable equipment for a durable repair, especially an ultrasonic welding machine, and long experience. Since both the patch material and the material of the papermachine fabric are fused together along the weld seam, the exact metering of applied ultrasonic energy is prerequisite for long durability of the repair. If too little ultrasonic energy is applied the patch will come off again. If too much ultrasonic energy is applied the papermachine fabric will be damaged, thereby increasing the damaged area. Moreover, in welding polyester a general problem arises in that polyester turns brittle when heated to high temperatures. Consequently, the mended damaged area has only low tenacity. Therefore, the chief problem in this mending method is the proper selection of the required level of ultrasonic energy.

Ultrasonic welding is applicable only to single layer fabrics. In the case of double layer fabrics or in the case of fabrics having two or more layers, damaged areas cannot be mended by applying a patch by means of ultrasound. The reason probably is that the ultrasonic pulses are absorbed, by the plurality of layers of weft and warp threads or by the plurality of fabric layers, to such a degree that a durably weld cannot be achieved. If the contacting pressure is increased, the fabric immediately melts away. The required precise selection of the contacting pressure and the ultrasonic energy is therefore generally not possible with double layer or multilayer fabrics in practice. However, in view of the higher expense of double layer or multilayer papermachine fabrics, there is a considerable interest in a practical method for mending damaged areas in such fabrics.

A further difficulty resides in the fact that the patch fabric must be rather thin so that it will protrude only minimally above the wire surface and will mark the paper web in the least possible way. However, thin patch fabrics, especially when the damaged area is rather large, are drawn by the vacuum of the suction boxes toward the running side and are worn through very soon. If the damage extends over a larger area it is therefore necessary, within the damaged area, to adhere an additional piece of fabric from the bottom side to the patch fabic in order to improve the wear resistance of the mended area.

Two wire formers are frequently made such that only one wire is driven, while the second wire is carried along by friction between the wires. Such interwire friction soon peels off any patches applied to the surface of one of the wires. The same may occur in normal papermachines when the first external wire roll has an auxiliary drive, and said wire roll rotates faster than the papermachine wire, which happens time and again in practice. This wire roll abrades the top side of the papermachine wire and any patches adhered to the top side are instantly worn through or torn off.

SUMMARY OF THE INVENTION

It is the object of the invention to provide a method for mending damaged areas in papermachine fabrics which is applicable also to double layer or multilayer papermachine fabrics and to papermachine fabrics for use in two wire formers where only one wire is driven. This object is realized in that the damaged area is filled with a radiation curable resin, the damaged area is irradiated, with the exception of individual dots, in order to crosslink the irradiated regions, and the non-crosslinked regions of the curable resin are rinsed off.

In the non-irradiated areas or dots no crosslinkage of the curable resin occurs so that in these areas the resin can be washed out thereafter. In this way the patch acquires the permeability required for dehydration of the paper pulp. The areas or dots that are not irradiated are so distributed and dimensioned that the cured resin at the damaged area corresponds as much as possible to the paper face of the papermachine wire, especially so that it has a comparable dehydrating capacity.

A curable resin, especially a photosensitive resin, may be employed which is cross linked by irradiation with ultraviolet light. As usual with all mending work, the damaged area must first be carefully cleaned and dried. Any projecting damaged wires of the fabric are removed. The damaged area is placed on a smooth surface. The photosensitive resin is applied onto the damaged area in liquid form and in such quantities that the hole in the damaged area itself and a portion of the bordering fabric are filled. A first mask having numerous individual light impervious dots or spots of about 0.8 to 2.5 mm diameter, preferably 1.0 to 1.5 mm diameter, is placed on top of the filled damaged area. The mask may be a printed sheet having such dots or spots. The mask can also be produced photographically. For this purpose a photograph is taken of the intact fabric surface on photographic film which is impermeable to ultraviolet light in the blackened areas. The film then records a picture of the paper face of the fabric in the scale 1:1. This picture serves as a mask. A second mask confines the area of the patch which is irradiated with ultraviolet light. In practice, therefore, a set of second masks of various sizes is suitably held in stock from which one corresponding in size to the damaged area is selected, and in this way determines the size of the cured synthetic area. The damaged area is then irradiated by means of an UV radiator. The irradiation period may be four minutes, for example. The two masks and the substrate are then removed and the damaged area is rinsed with water. The crosslinked regions of the resin are retained, while the regions not crosslinked as a result of the light impervious dots can be rinsed away. This makes the area of the repair permeable so that forming also takes place in said area.

The advantages attainable by the invention especially reside in the fact that the synthetic resin patch protrudes neither on the top side nor on the bottom side of the papermachine fabric. However, on the other hand the patch is thicker than the patch fabrics used, for example, in ultrasonic welding, so that in the method of the invention the abrasion resistance is better. The crosslinked resin covers the wires and fabric portions around the damaged area and is consequently firmly bonded to the fabric of the papermachine clothing so that the durability of the patch is extraordinarily good.

Suitable photosensitive resins are especially acrylates, e.g., epoxy acrylates, urethane acrylates, polyester acrylates, silicone acrylates, and methacrylates or unsaturated polyesters. The resins contain from one to eight percent photo initiator. The absorption maximum of the photoinitiators corresponds to the extinction maximum of the UV high pressure mercury vapor lamp. The photoinitiators, when irradiated with ultraviolet light, form radicals initiating the polymerization. The curing can be radical or cationic polymerization initiated. If occasion arises, inhibitors in an amount of one to five percent may be added. For initiation of the photochemical reaction high pressure mercury vapor lamps can be employed which generate ultraviolet light in the UV-A, UV-B, OR UV-C range. Preferably UV-A radiation of a wave length of 315 to 380 nm is used. In order to improve the tensile strength and durability of the patch individual filaments can be inserted especially in longitudinal direction for reinforcement. For this purpose, carbon fibers or other high strength fibers, e.g., aramide fibers, (Kevlar, Twaron) or polyester fibers are especially suited. The reinforcement can be effected also by insertion of a piece of fabric cut to size which is identical with the wire fabric and exactly fits into the opening of the damaged area, or by insertion of fine fabric. The insertion of individual threads in longitudinal direction is generally more advantageous, however. In this way the transmission of force within the mended area is improved and the formation of ridges is prevented.

A curable resin such as a resin (prepolymer) curable by electron radiation may be employed. The individual method steps can be similar to the steps taken with the use of a photosensitive resin in that masks are employed which are impermeable to electron radiation. Moreover, it is possible to operate with a precisely directed electron beam source by which the damaged area is irradiated in line or grid fashion in such a way that in said area the desired structure of curable resin simulating the intact fabric surface is formed. The dots or areas where later on the interstices corresponding to the fabric interstices are to be formed by washing the resin out can be produced by guiding the beam around said dots and areas, or by brief shut down of the electron radiation source.

With this method of the present invention any damages occurring during use of the wire in the papermaking machine can be repaired. The method offers itself also for mending damages which may have occurred during the manufacture of the fabric by the wire manufacturer, e.g., if the fabric has hole-like defects originating from its manufacture.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
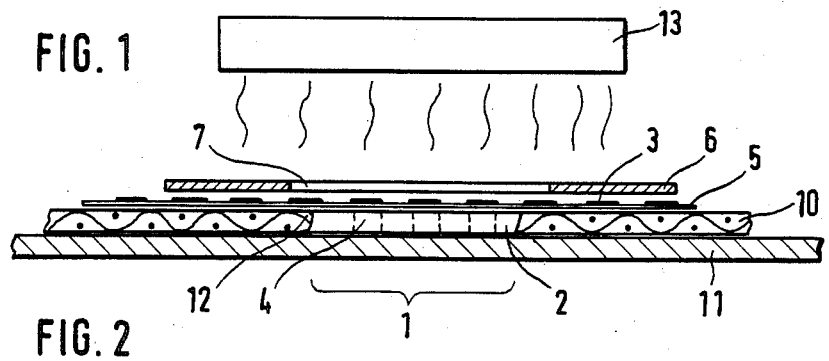
FIG. 1 is a sectional view of the damaged area in a papermachine clothing with the masks placed on said area.
Figure 2:
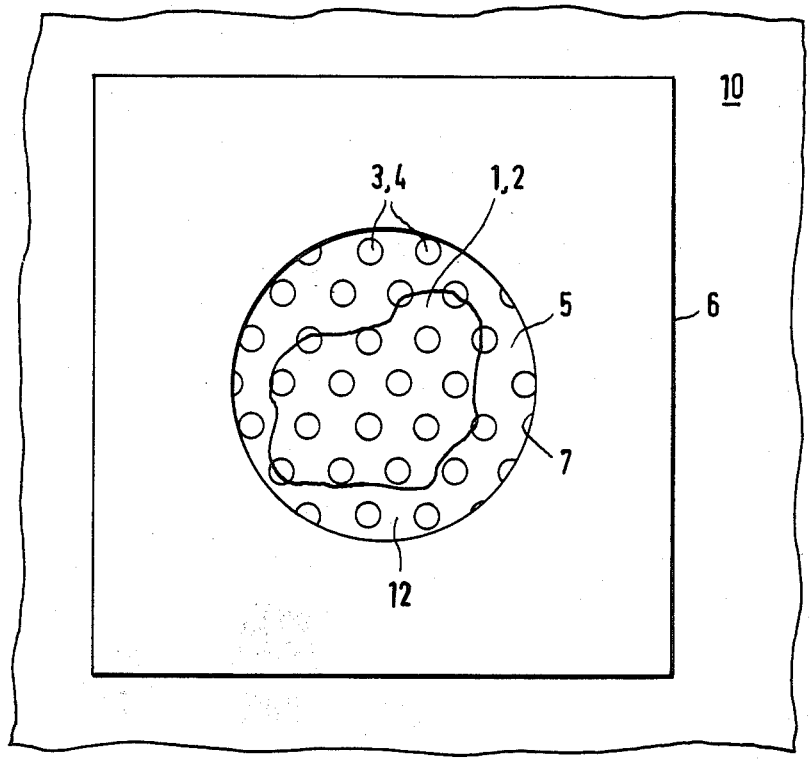
FIG. 2 is a plan view showing the damaged area with the masks placed thereon.

FIG. 1 illustrates the damaged area 1 within the fabric of a synthetic resin papermachine fabric 10 in vertical section. The defective area is filled with photosensitive resin 2. From below, the defective area 1 is supported by a smooth supporting surface 11 which prevents the resin from dripping off in the downward direction. The resin 2 is spread not only over the hole of the damaged area 1 but also into the marginal area of the damaged area 1 so that after crosslinkage it makes a firm bond with the papermachine fabric 10. After the defective area has been filled with resin 2 a first mask 5 is placed thereon which has a multiplicity of light impervious dots 3 of about 1 to 1.5 mm diameter spaced about equal distances apart. A second mask 6 is placed on the first mask 5 and serves as a diaphragm and has an opening 7 which is somewhat larger than the defective area 1. The second mask 6 confines the irradiated area in order that in the marginal zone of the defective area 1, the resin 2 is irradiated and crosslinked only in a marginal strip 12 (FIG. 1) just sufficient to insure safe bonding of the patch to the papermachine fabric 10.

The resin 2 is irradiated through the two masks 5, 6 by an ultraviolet lamp 13. The irradiation period depends on the type of photosensitive resin, the proportion of photoinitiators and on the presence of any inhibitors. Of course, it also depends on the irradiation intensity and the wavelength. A wavelength within the range of UV-A radiation (315 to 380 nm) is suitable. The irradiation period may be four minutes, for instance.

After irradiation the masks 5, 6 and the supporting surface 11 are removed and the defective area 1 and the adjacent region is thoroughly rinsed with water. The areas of the resin 2 covered by the masks are not crosslinked so that the portion of the resin is rinsed away. This leaves the patch with a multiplicity of apertures imparting thereto a permeability comparable to that of the papermachine fabric 10. The passageways are formed in the areas of the light impervious dots 3 of the first mask 5.

Figure 3:
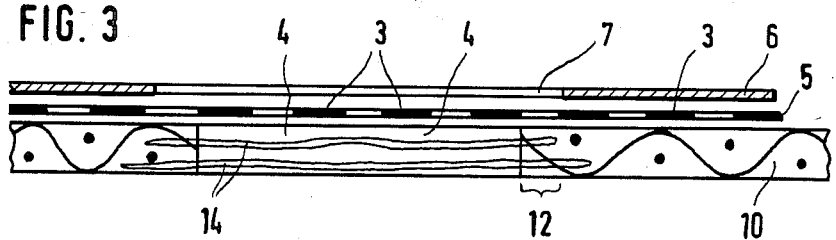
FIG. 3 is a sectional view through the mended damaged area.

As shown in FIG. 3, filaments 14 of high tenacity can be embedded in the resin 2 especially in longitudinal direction, e.g., carbon fibers or Kevlar monofilaments.

While the invention has been particularly shown and described with reference to preferred embodiments thereof it will be understood by those in the art that the foregoing and other changes in form and details may be made therein without departing from the spirit and scope of the invention.

What is claimed is:

1. A method for mending damaged areas in papermachine fabrics comprising:
    filling the damaged area with a radiation curable resin;
    irradiating the damaged area with the exception of a plurality of spaced apart dot-like areas in order to crosslink the resin in the irradiated areas; and
    rinsing the area filled with resin to remove the non-crosslinked areas of the photosensitive resin.

2. The method according to claim 1 wherein the curable resin is photosensitive and further comprising placing mask means having individual light impermeable dots over the damaged area prior to irradiating the damaged area.

3. The method according to claim 1 wherein said mask means includes a first mask having light impermeable dots with a diameter of 0.8 to 2.5 mm.

4. The method according to claim 3 wherein the light impermeable dots have a diameter of 1 to 1.5 mm.

5. The method according to claim 3 wherein said mask means also includes a second mask placed on said first mask and having an opening which is somewhat larger than the damaged area.

6. The method according to claim 1 wherein the curable resin is a prepolymer curable by an electron beam and further comprising irradiating the resin by an electron beam generator which is guided over the damaged area with the exception of a plurality of spaced dot-like areas.

* * * * *